G. A. DALY.
SAWING APPARATUS.
APPLICATION FILED APR. 8, 1912.
1,053,578.
Patented Feb. 18, 1913.
2 SHEETS—SHEET 2.
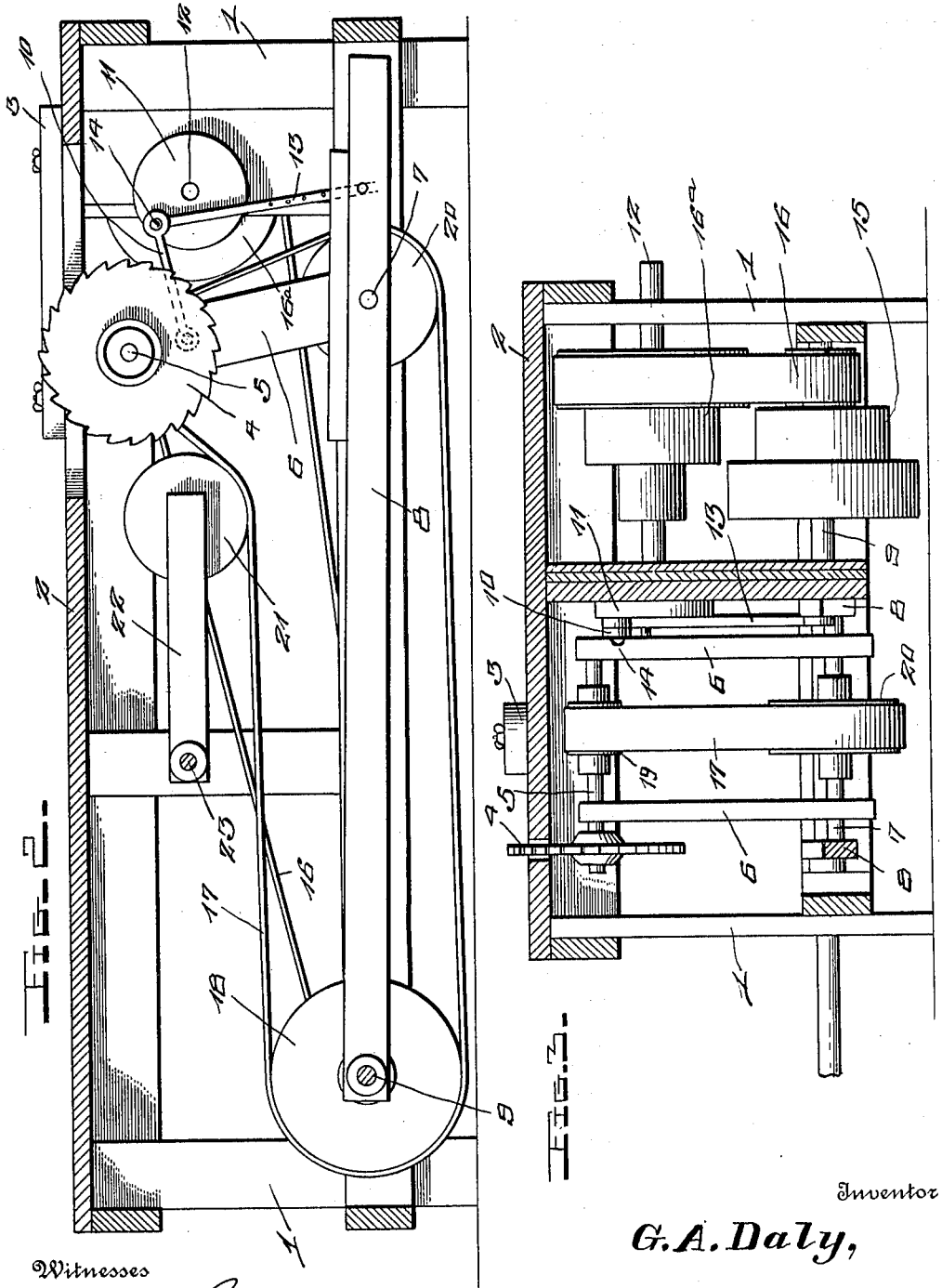
Witnesses
Chas. L. Griesbauer.
A. B. Norton
Inventor
G. A. Daly,
By Watson E. Coleman
Attorney

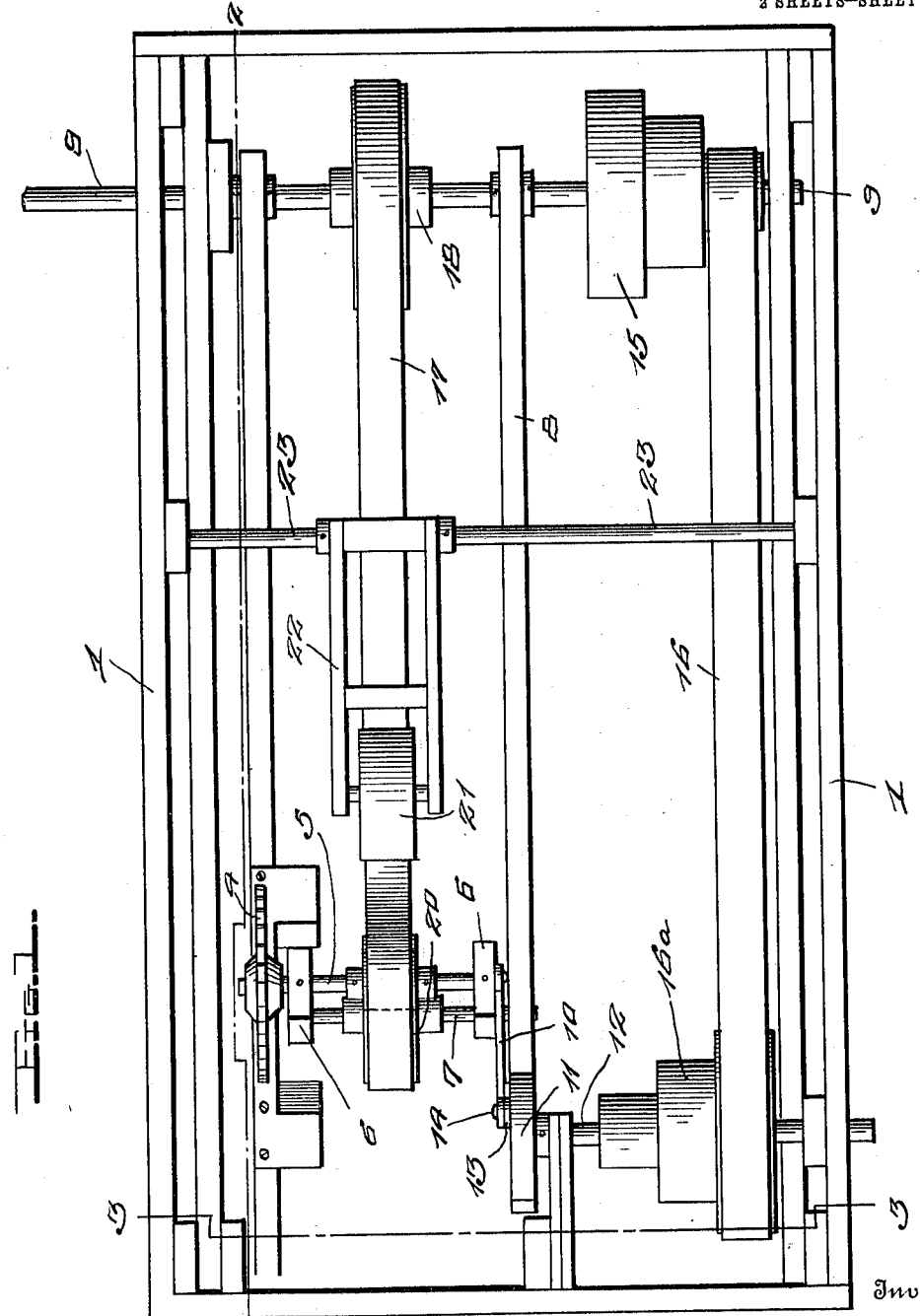

UNITED STATES PATENT OFFICE.

GEORGE ANDREW DALY, OF KLAMATH FALLS, OREGON.

SAWING APPARATUS.

1,053,578.    Specification of Letters Patent.    Patented Feb. 18, 1913.

Application filed April 8, 1912. Serial No. 689,294.

*To all whom it may concern:*

Be it known that I, GEORGE ANDREW DALY, a citizen of the United States, residing at Klamath Falls, in the county of Klamath and State of Oregon, have invented certain new and useful Improvements in Sawing Apparatus, of which the following is a specification, reference being had to the accompanying drawings.

This invention comprehends certain new and useful improvements in sawing apparatus and relates particularly to saws that are known as cut-off saws designed for use especially in box and sash and door factories where the material is first cut into short lengths.

My invention has for its primary object a simple, durable and efficient construction of cut-off saw, the parts of which are so constructed and arranged that immediately after the board or other material is cut off, the saw will be automatically brought below the top of the table, the frame which carries the saw receding or making its backward stroke while the saw is below the table top, thereby allowing the operator ample time to judge his board or other material and place it for the next cut which will occur on the automatic upward and forward movement of the saw, economies in both time and material being thus effected.

As is well known to those versed in the art to which this invention appertains, with the ordinary construction of cut-off saw, it is necessary for the operator to wait, after one cut has been made, until the saw has receded far enough for him to advance his board or the like for the next cut and my invention aims to avoid this unnecessary waste of time by providing saw carrying frames so constructed and arranged that the saw will immediately disappear below the table top after a cut has been made, and move backward for its return stroke while still below the top of the table, so that the operator can shift his board immediately after a cut has been made.

The invention also has for its object an improved construction of cut-off saw wherein all of the movements of the saw may be performed by power, the operator's hands being entirely free for judging his work and for shifting the board or other material after each successive cut, this construction and arrangement of parts not only saving time and material but relieving the operator of a great deal of hard labor.

The invention has for a further object new and useful improvements in cut-off saws embodying, in connection with the saw driving belt, a swinging tightener whereby relatively thick material may be cut without the necessity of losing time in adjusting the belt and other parts.

My invention also aims to generally improve devices of this class and to render them more useful and commercially profitable.

For a full understanding of the invention, reference is to be had to the following description and accompanying drawings in which—

Figure 1 is a top plan view of a sawing apparatus embodying the improvements of my invention, the top of the table being removed; Fig. 2 is a longitudinal sectional view on the line 2—2 of Fig. 1; Fig. 3 is a transverse sectional view on the line 3—3 of Fig. 1.

Corresponding and like parts are referred to in the following description and indicated in the accompanying drawings by like reference characters.

My improved cut-off sawing apparatus includes a frame work or table 1, provided with the usual top 2, having a stop bar 3 secured thereto in the usual or any preferred manner.

4 designates the saw proper which is of the revoluble disk type. The saw 4 is mounted on a transverse shaft or arbor 5, which is journaled in the upper ends of laterally spaced bars 6 which constitute one of the frames for supporting the saw in its revoluble and gyratory movements. The lower ends of the frame bars 6 are pivotally mounted upon the transverse shaft 7, which is journaled in relatively horizontal bars 8 constituting the other supporting frame for the saw. The frame bars 8 are pivotally mounted to swing about a horizontal axis by being mounted at one end upon a transversely extending shaft 9 which is journaled in the lower sills of the framework or table 1, as clearly illustrated in the drawings.

The relatively vertical frame which is composed of two side bars 6, before mentioned, has one of said side bars connected to a link rod 10, which is eccentrically connected to a disk 11, mounted upon a transverse shaft 12 journaled in the frame work or table. The relatively horizontal frame composed of the side bars 8 has one of said side bars correspondingly connected to the disk 11 by a link 13, the two links, in the present embodiment of the invention, being connected to the disk 11 at a common point, as indicated at 14.

The drive shaft of the apparatus is the shaft 9, and it is provided with a cone or stepped pulley 15 around which a driving belt 16 passes, said belt also extending around a corresponding but oppositely disposed pulley 16$^a$ on the eccentric shaft 12.

In order to drive the saw, that is, cause it to rotate, in its gyratory movement, I provide a driving belt 17 which passes around a pulley 18 carried by the shaft 9, around a relatively smaller pulley 19 carried by the arbor or shaft 5 and around a pulley 20, which is mounted on the shaft 7.

21 designates a floating tension idler which is mounted in a vertical swinging frame 22, swung from a transverse rod 23 which extends across the table under the top thereof.

From the foregoing description in connection with the accompanying drawings the operation of my improved sawing apparatus will be apparent.

In the practical use of the device motion supplied to the shaft 9 through any suitable source of power, will be transmitted by the driving belt 16 to the pulley 16$^a$, whereby the shaft 12 will be rotated, and through the instrumentality of the disk 11 and the eccentric link connection between said disk and the frames 6 and 8 will cause the shaft 5 to have a gyratory movement as it rotates around its longitudinal axis, the frames composed of the swinging bars 6 and 8 being oscillated and one oscillated on the other so that, as the saw is rapidly rotated by means of its driving belt 17, it will be moved forwardly and upwardly through the board or other material supported on the table top 2 against the stop 3, and will, immediately after making the cut, move downwardly below the table top and remain below the table top in its backward movement so as to give the operator ample time to judge and adjust his board or the like for the next cut. By providing the cone pulleys 15 and 16$^a$ the speed of the gyration may be varied. In the present embodiment of the invention three different speeds can be maintained. For example, the gyratory feeding apparatus may have either 40, 70, or 100 strokes per minute, the saw making a cut on each stroke.

It will thus be seen that I have provided a very simple construction of sawing apparatus that will possess all of the advantages and which will fulfil successfully the objects of invention sought to be attained.

I claim:

A sawing apparatus of the character described, including a table, a revoluble saw, a frame mounted to swing in the table about a horizontal axis, another frame mounted to swing on the first named frame and extending upwardly therefrom, the saw being carried by the second named frame, a disk, means for rotating said disk, and links eccentrically connected to said disk, one of said links being pivotally connected to the first named frame and the other pivotally connected to the second named frame.

In testimony whereof I hereunto affix my signature in the presence of two witnesses.

GEORGE ANDREW DALY.

Witnesses:
   J. D. MORRISON,
   R. E. SMITH.

---

Copies of this patent may be obtained for five cents each, by addressing the "Commissioner of Patents, Washington, D. C."